(No Model.) 2 Sheets—Sheet 1.
DE W. C. SANFORD.
Refrigerator and Refrigerator House.
No. 239,345. Patented March 29, 1881.
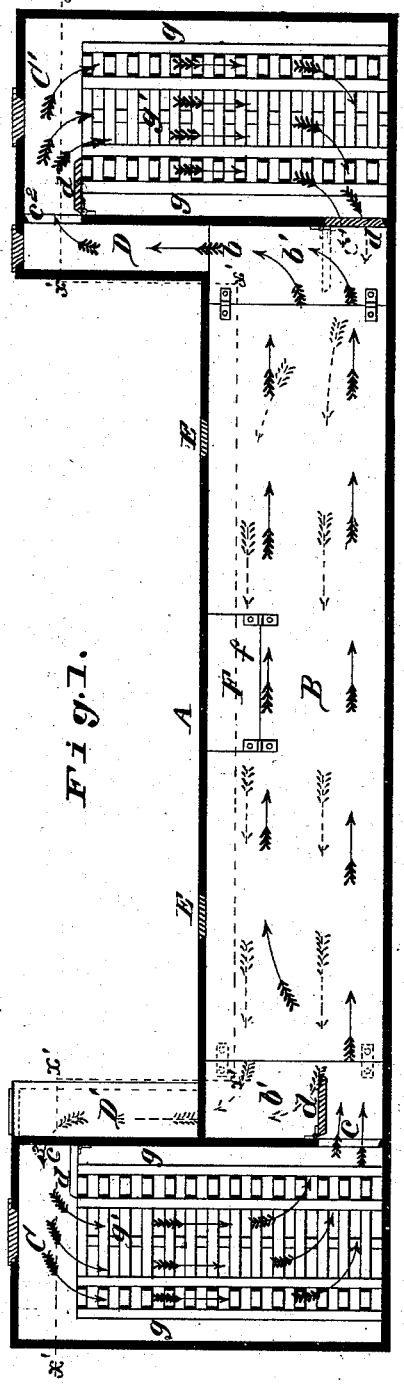
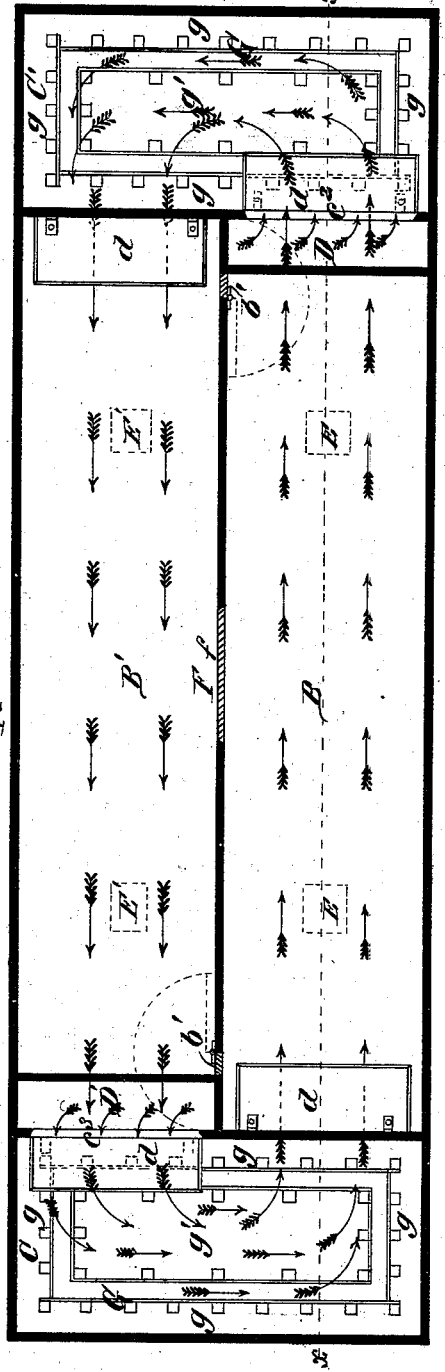
Attest:
Charles Pickles
Solon U. Sapp.
Inventor:
DeWitt C. Sanford.
by C. D. Moody atty.

(No Model.) 2 Sheets—Sheet 2.
DE W. C. SANFORD.
Refrigerator and Refrigerator House.
No. 239,345. Patented March 29, 1881.
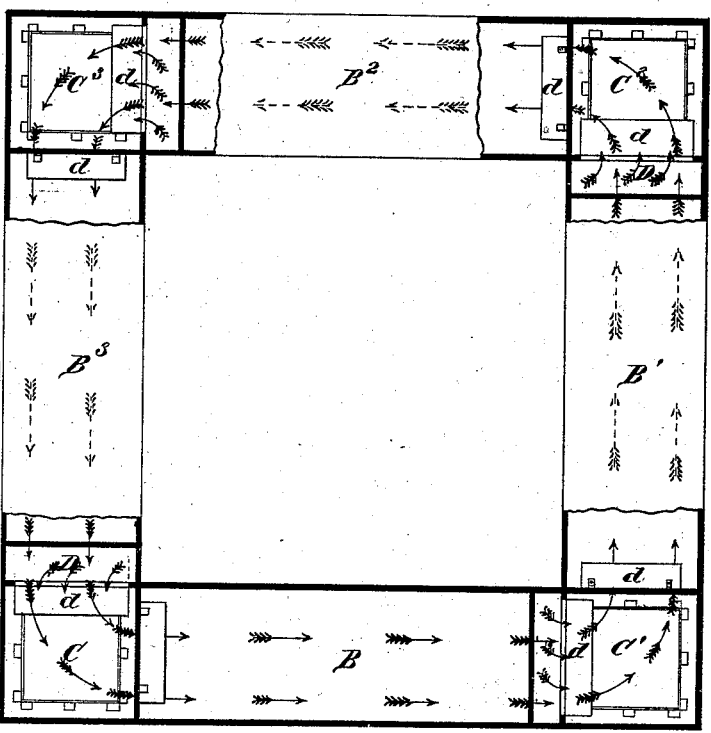
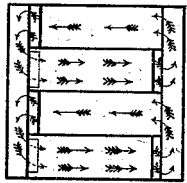
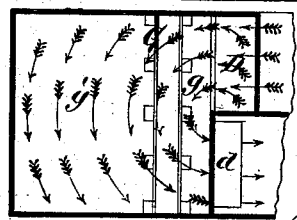
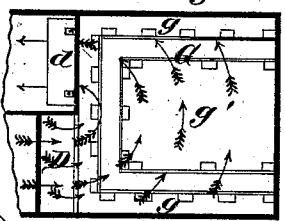
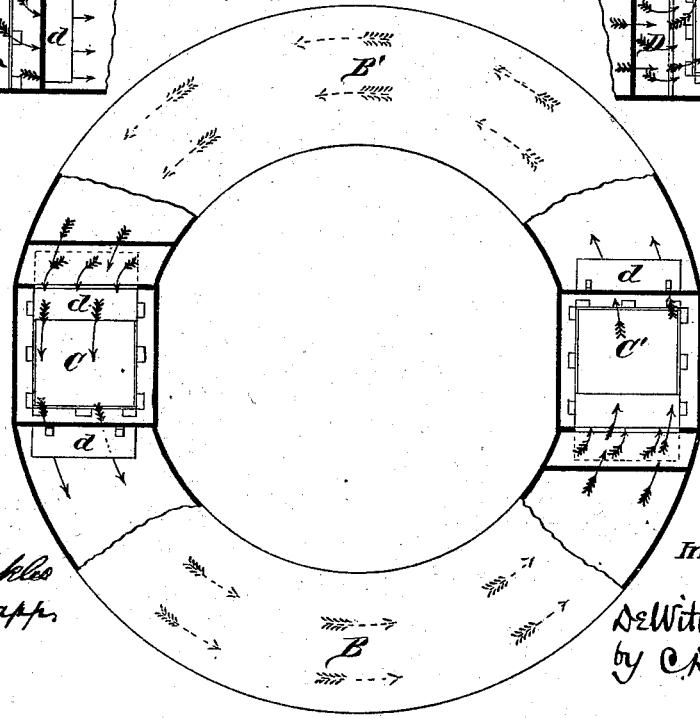
Attest:
Charles Pickles
Solon U. Sapp
Inventor:
DeWitt C. Sanford
by C. D. Moody,
atty.
N. PETERS, PHOTO-LITHOGRAPHER, WASHINGTON, D. C.

UNITED STATES PATENT OFFICE.

DE WITT C. SANFORD, OF ST. LOUIS, MISSOURI.

REFRIGERATOR AND REFRIGERATOR-HOUSE.

SPECIFICATION forming part of Letters Patent No. 239,345, dated March 29, 1881.

Application filed July 27, 1880. (No model.)

*To all whom it may concern:*

Be it known that I, DE WITT C. SANFORD, of St. Louis, Missouri, have made a new and useful Improvement in Refrigerators and Refrigerating-Houses, of which the following is a full, clear, and exact description, reference being had to the annexed drawings, making part of this specification, in which—

Figure 1 is a vertical longitudinal section taken on the line $x\ x$ of Fig. 2; Fig. 2, a horizontal section taken on the line $x'\ x'$ of Fig. 1; Fig. 3, a plan (the top being partly removed) of a modification of the improvement; Fig. 4, a plan (the top being partly removed) showing a further modification; Fig. 5, a detail, showing, in horizontal section, the air-cooling chamber and the adjoining ends of the refrigerating-compartments. A modification of the ice-crib is therein shown. Fig. 6 is a view similar to that of Fig. 5, and showing a further modification of the ice-crib; Fig. 7, a vertical section, showing two sets of the refrigerating-compartments, one set above the other set, and both sets being connected with the same air-cooling chambers; and Fig. 8, a horizontal section, showing two sets of refrigerating-compartments arranged side by side and connected with same air-cooling chambers.

The same letters denote the same parts.

The present is one of a series of improvements in refrigerators and refrigerating-houses having an air-cooling chamber and one or more refrigerating-compartments.

It consists, mainly, in the use of relay air-cooling chambers—that is, in place of having but a single air-cooling chamber, two or more are employed, and arranged and connected so that the air, after leaving an air-cooling chamber and traversing a refrigerating-compartment, and thereby becoming warmed, may pass through a second air-cooling chamber and be chilled again before being sent into a second refrigerating-compartment and back to the first air-cooling chamber, or be sent through a series of air-cooling chambers arranged at various points along a series of refrigerating-compartments, and thereby, from time to time, be chilled again and again before finally returning to the original air-cooling chamber.

The improvement also has reference to the construction of the ice-cribs in the air-cooling chamber, and to various details hereinafter described.

Referring to the drawings, A, Figs. 1 and 2, represents a construction having the refrigerating-compartments B B' and the air-cooling chambers C C'. The latter are arranged at the ends, respectively, of the former, and are connected therewith by suitable openings and flues. The air leaving, say, the chamber C passes through the opening $c$ into and through the refrigerating-compartment B, and thence into the air-cooling chamber C', where it is cooled. The air flows thence through an opening, $c'$, (shown in dotted lines,) at the bottom of the chamber C', into and through the refrigerating-compartment B', and thence back into the first air-cooling chamber C, and so on round and round. The outlets through which the air leaves the air-cooling chambers are at the bottom of the latter, and the inlets for the air to enter the air-cooling chambers are at the top of the chambers. The air-cooling chambers are preferably made higher than the refrigerating-compartments, and when thus made the air passes from the compartments to the chambers through flues—that is, the air passes from the compartment B, through the opening $b$, into the flue D, and thence through the opening $c^2$ into the chamber C'. The air then passes down through the chamber C', out through the outlet $c'$, (shown in dotted lines,) into and through the compartment B', and thence through the flue D', up to the inlet $c^3$, through which the air re-enters the chamber C. All the openings $c\ c'\ c^2\ c^3$ are provided with doors or valves $d\ d\ d\ d$, to regulate the flow of the air. The air from the compartment B may, by means of a doorway at $b'$, pass directly into the compartment B when desired.

E E' represent hatchways, through which articles (hogs, for instance) may be lowered into the chilling-compartments B B'.

F represents a valveway, through which, when only one end of the compartment B is being used, the air can be discharged from the compartment B into the compartment B', and thus not be required to traverse the entire length of the compartment; but when the entire compartment is being used the valveway must be closed by a suitable valve, $f$. By means of the doorways $b'\ b'$ the compartments B B' can be used in connection with but one of the air-cooling chambers, and with either one of the chambers, as desired. For instance, if the ice in the chamber C becomes consumed, or is melted down so low as to be unavailable, the chamber C' alone may be used for refrigerating the air-current, and vice versa. Also, one of the chambers C C' may, in place of ice, be furnished with an air-cooling apparatus, while the other chamber may be filled with ice, to be used in case the working of the apparatus is for any cause interfered with.

G represents a desirable form of ice-crib to use in an air-cooling chamber wherein ice is employed as the cooling agent. In place of extending the crib entirely through the chamber, it is extended along one end only, (the end nearest the refrigerating-compartment,) as in Fig. 5, or along that end and the sides of the chamber, as in Fig. 6, or along both ends and sides, as in Figs. 1 and 2, in all cases leaving a flue-space, $g$, on the outer side of the crib, through which the air can pass from the crib to the refrigerating-compartment, and also a central space, $g'$, to receive a mass of ice and the warm air entering the chamber to be cooled.

The operation of this feature of the improvement is as follows: The ice is closely packed in the space $g'$, and the crib G is loosely filled. The crib then serves three purposes—to form the flue-space $g$, to increase the cooling-surface of the ice as the latter is not packed so compactly in the crib as in the space $g'$, and to provide means by which the ice can be supported at high levels in the air-cooling chamber when the mass of ice in the space $g'$ is low down in the chamber; for, as the ice melts away in the space $g'$, a portion of it can, from time to time, be placed in the crib, filling the latter up to the top, and thereby getting the benefit of a high column of ice, and with a comparatively small quantity of ice. The air entering through the inlet $c^2$ or $c^3$, Figs. 1 and 2, passes down into the space $g'$, coming in contact with the mass of ice therein. It passes thence through the crevices of the loose ice in the crib G, into the flue-space $g$, and thence to the refrigerating-compartment. As it is desirable to prevent the air from diving from the inlet $c^2$ directly down into the space $g$, guards—such as the door $d$—may be turned down or placed over the top of the space $g$, and thus compel the air, before descending, to flow to above the crib and space $g'$.

The refrigerating-compartments B B', in place of being arranged immediately alongside of each other, as in Figs. 1, 2, may be separated from each other, and when thus separated the compartments may be extended between the air-cooling chambers in any desired form—for instance, as shown in Fig. 4, where the construction, in its general outline, is circular. A further modification is as shown in Fig. 3, where a series, C C' C² C³, of air-cooling chambers, connected by a corresponding series, B B' B² B³, of refrigerating-compartments, are used. In these modifications the flow of the air-currents is indicated by the arrows, and the openings and flues connecting the air-cooling chambers and refrigerating-compartments are similar to those first above described, and arranged at those sides of the air-cooling chambers most convenient to the refrigerating-compartments.

The present construction can be used for a drying-house as well as for refrigerating.

The refrigerating-compartments need not necessarily be in pairs. Any number may be used in conjunction when arranged parallel, or substantially parallel, with each other, and having an air-cooling chamber in common at each end of the series.

I claim—

1. In a refrigerator or refrigerating-house, a relay air-cooling chamber, the inlet to the main, and also to the relay air-cooling chamber, being from the upper part of the refrigerating-chamber, for the purpose described.

2. The combination of the compartments B B' and the chambers C C', substantially as described.

3. The combination of the compartments B B' and the elevated chambers C C', the former delivering the air into the latter through the flues D D', substantially as described.

4. The combination of the compartments B B' and the chamber C, said compartments opening into each other at the doorway $b'$, as and for the purpose described.

5. The combination of the compartments B B' and the chambers C C', said compartments opening into each other at the doorways $b'$ $b'$, substantially as and for the purpose described.

6. In an air-cooling chamber, the crib G, constructed and arranged to form the flue-spaces $g$ $g'$ within the air-cooling chamber, substantially as described.

7. The combination of the chambers C C' C² C³ and the compartments B B' B² B³, substantially as described.

D. W. C. SANFORD.

Witnesses:
CHAS. D. MOODY,
G. H. SOKER, Jr.